Oct. 9, 1956 — M. V. NOVAK — 2,765,923
BLOOD FILTER
Filed April 3, 1953

INVENTOR.
Milan V. Novak
BY Kane, Dalsimer and Kane
ATTORNEYS

United States Patent Office 2,765,923
Patented Oct. 9, 1956

2,765,923

BLOOD FILTER

Milan V. Novak, Lombard, Ill.

Application April 3, 1953, Serial No. 346,554

7 Claims. (Cl. 210—164)

This invention relates to a structurally and functionally improved filter capable of use in numerous different associations but primarily intended to be employed in the filtering and administration of blood and its compounds or intravenous solutions.

It is an object of the invention to provide a structure of this nature which may readily be used by relatively unskilled personnel for the filtering of liquid and especially blood and similar products; the filter serving as a connecting conduit or passage between, for example, a vein and a receptacle, a pair of receptacles or in any other association where the elected liquid is to flow between given points and at the same time to be filtered.

An additional object is that of furnishing an assembly of this type which—if a tendency toward clogging of the filter occurs—an operator without loss of any time or use of extraneous appliances will be able to relieve or correct the condition.

Still another object is that of providing a filter structure which will include relatively few parts, each adequately rugged in design and capable of economical manufacture to furnish a unitary assembly of desired length which will be quite inexpensive to produce.

With these and other objects in mind, reference is had to the attached sheet of drawings illustrating practical embodiments of the invention and in which.

As is well understood, in connection with the administration of plasma, blood, or other fluids, it is usually necessary to employ a filter structure. Heretofore, such a structure has embraced a single entity conveniently attached to rubber or plastic tubing to, for example, conduct the selected liquid from a bottle or receptacle into the patient's blood vessel. The tubing being separate from the filtering structure, the assembly for administering blood has been cumbersome, inefficient, liable to breakage, costly and, in certain instances, dangerous.

By means of the present teachings, these difficulties are overcome in that the filtering structure becomes, in effect, an integral part of the liquid-conducting tubing used for administration of parenterally suitable agents. While, as afore brought out, it is a primary purpose of the present invention to furnish a filtering and fluid-conducting structure to be used in connection with medical work and especially the dispensing of blood and related liquids, the present teachings may be employed to advantage in other associations. Therefore, while the present description and drawings exemplify the preferred use of the apparatus, such disclosure is to be taken in an illustrative, rather than a limiting sense, except where otherwise indicated.

Figure 1:
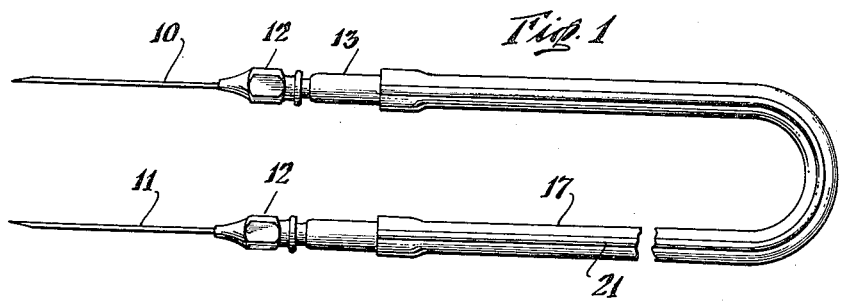
Fig. 1 is a fragmentary side elevation of the filter showing the latter assembled with a pair of hollow needles.
Figure 2:
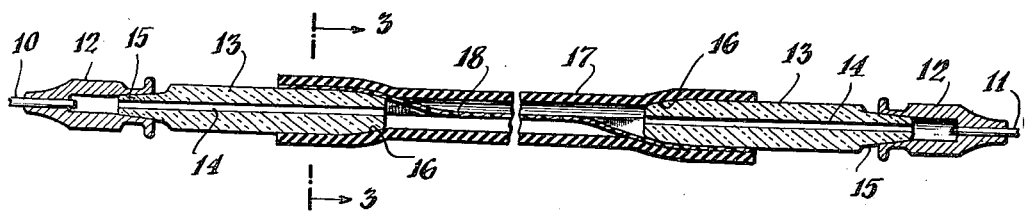
Fig. 2 is a longitudinal sectional view in enlarged scale of the assembly as shown in Fig. 1.

Thus, referring to Figs. 1 and 2, the numerals 10 and 11 indicate needles of the hypodermic type which have associated with them hub portions 12. The latter are mounted upon the outer end of adapters 13 provided with fluid-conducting bores 14. To this end, the outer zone of these elements may be tapered as at 15 to provide a suitable support and coupling for hubs 12. Their inner ends may be tapered as at 16 so that these parts may readily be introduced into the ends of flexible tubing 17.

Figure 3:
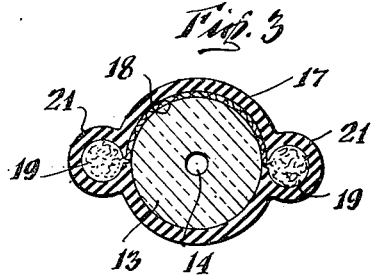
Fig. 3 is a transverse sectional view taken along the line 3—3 and in the direction of the arrows as indicated in Fig. 2.
Figure 8:
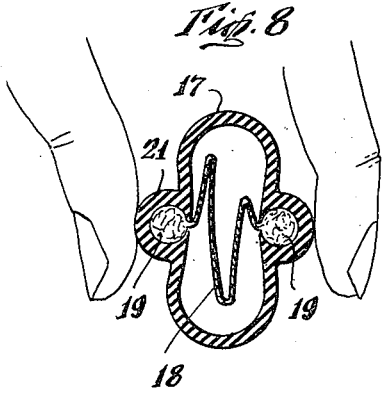
Fig. 8 is a sectional view illustrative of the manipulation of the parts to avoid tendencies of the filter toward clogging.
Figure 5:
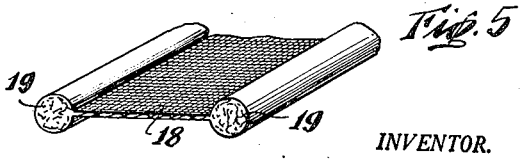
Fig. 5 is a perspective view of a filtering unit of the type shown in Fig. 3.

Tubing 17 may be constructed of any suitable material but is preferably formed of a plastic. To this end, a Vinylite elastoplast compound is preferably employed. The filter proper embraces a strip of gauze which again may embrace any suitable material, but is preferably nylon. That gauze may include from 70 to 100 mesh to the square inch. A strip suitable for use in this connection has been shown in the several figures and may include, as in Figs. 3, 5 and 8 a body 18, the side edges of which are secured to beadings 19 formed of cord or in any other suitable manner, to prevent a separation of the strip proper from the side members or portions. So constructed the strip may be placed in operative association with an extruding nozzle (not shown) which serves to form tubing 17. At diametrically opposite points in its circumference, this tubing conveniently presents as integral parts, channel portions 21. Each of these receives one of the side beads or cords 19 and retains the latter so that strip 18 normally extends transversely of tubing 17.

Figure 4:
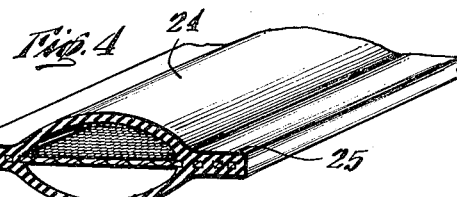
Fig. 4 is a fragmentary perspective view of an alternative and, in some respects, preferred design.
Figure 6:
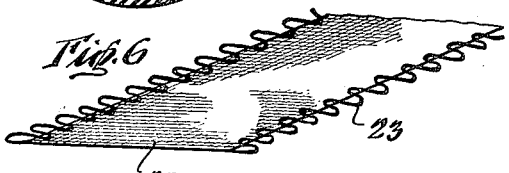
Figs. 6 and 7 are views similar to Fig. 5 but illustrating optional forms of structure.
Figure 7:
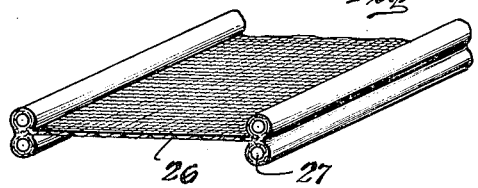

If a strip of the nature shown in Fig. 6 at 22 is employed, it again will be mesh and preferably formed of nylon. In this instance, however, it is provided with one or more courses of relatively open mesh 23 adjacent its side edges. Such a strip, placed in operative association with an extruding nozzle or other tube-forming structure, will be combined with the tubing which is produced and anchored against separation from the latter incident to the plastic material of the tubing keying through the open mesh 23. Under these circumstances, and as shown in Fig. 4, tubing 24 may be provided with flange portions 25, which again are preferably at diametrically opposite points and which have the marginal portions of the strip 22 incorporated in them so that this strip is suitably anchored along its side zones. Likewise, if a strip such as has been shown at 26 in Fig. 7 is provided with marginal beads or cord portions 27 formed of filaments or nylon thread, these marginal portions may be anchored in position with respect to the tubing either in the manner shown in Fig. 3, or, for example, in Fig. 4. In any event, where cords or beads are molded into the vinyl tubing, they should be substantially non-stretchable.

In use, it will be understood that one of the needles 10—11 may be of the vena type while the other is of a type suitable for puncturing the seals of receptacles containing or to receive blood or other liquids. Of course, both needles may be employed for the puncturing of seals where liquid is to be transferred from one receptacle to another. Likewise, connecting units, other than needles, might, in certain instances, be employed. Where they are not used, then adapters of different configuration or other coupling elements will be substituted for those shown. However, when needles are utilized, then after suitable sterilization of these and the adapters 13, the needles are mounted on the latter and the inner ends of those elements are introduced into the opposite ends of the tubing 17. In such introduction, a notch may be cut into the adjacent ends of strips 18, 22 or 26 so as to facilitate the telescoping of the parts. In all instances, the tubing should present no corners or pockets but rather embody smoothness and be curved around the surfaces of its interior so as to prevent clotting and not present impediments to the flow of blood or other liquid.

That tubing and its enclosed filter strip will be sterilized at any desired time up to and including complete assembly of the parts. It will be cut into suitable lengths (for example, four feet) at the time that the needle or other coupling units are to be connected thereto. Regardless of the type of coupling elements employed, they should be introduced as shown in Fig. 2, in a manner such that one of them extends in contact with one face of the mesh strip and presses the opposite face of the same into substantially fluid-tight sealing relationship with the adjacent face of the tubing. The opposite face of the tubing will, of course, conform to the opposite face of the adapter 13 or equivalent element.

The second adapter or coupling is applied to the opposite end of the tubing in the same manner but extends in contact with the opposite face of the mesh strip. Therefore, the liquid in flowing through the length of the tubing will necessarily have to pass through the interstices of the strip. So flowing, it will be filtered.

With, for example, the strip having an effective width of one-half inch and the strip and tubing containing the same being approximately four feet long, it is apparent that an adequate filtering surface is present. In this connection, it will be understood that usually at least twelve square inches of filtering surface should be available in the filtering of one pint of blood. If despite the excess areas thus provided the filter has a tendency to clog due to the depositing upon its surface of particles, then this condition may readily be relieved. The procedure involved is somewhat schematically indicated in Fig. 8 in which an operator's fingers are shown as flexing or pressing against the opposite side faces of the tube so as to collapse and thereupon distend the same. This will result in the contained strip being likewise flexed to somewhat fold upon itself and then expand. Due to this action, the deposited particles will be freed from contact with the surface of the mesh and will re-deposit over another surface of the same thereby assuring of an adequate filtering action.

Thus, among others, the several objects of the invention as specifically aforenoted are achieved. Obviously numerous changes in construction and rearrangement of the parts might be resorted to without departing from the spirit of the invention as defined by the claims.

I claim:

1. A filter including in combination a flexible tube, a strip of mesh material extending longitudinally within said tube from one to the other end thereof, beads defining the marginal edges of said strip and said beads being embedded within the material providing the tube wall.

2. A filter construction adapted to filter blood, plasma and other body fluids comprising a tube, a bead on opposite sides of said tube, a filtering strip held by said beads to opposite sides of said tube, said filtering strip extending longitudinally of said tube, substantially the entire length thereof to a needle holding portion at each end of said tube, said holding portion adapted to hold a bored needle for the transfer of blood through said filtering construction.

3. A filter construction as in claim 2 wherein said filtering strip embraces an area of not less than about 12 square inches of filtering surface.

4. A filter construction as in claim 2 wherein said tube is made of a flexible material which is adapted to be flexed and thereby dislodge material on said filtering strip.

5. A filter construction as in claim 2 wherein said filtering material has a mesh size of from about 70 to 100 mesh per square inch.

6. A filter construction as in claim 2 wherein said tube and said filtering material are both formed of flexible material.

7. A filter construction as in claim 2 wherein said bead is a flattened flange.

References Cited in the file of this patent

UNITED STATES PATENTS

| 1,174,784 | Wasson | Mar. 7, 1916 |
| 1,331,732 | Wait | Feb. 24, 1920 |
| 1,782,531 | Fokker | Nov. 25, 1930 |
| 2,153,664 | Freedlander | Apr. 11, 1939 |
| 2,341,114 | Novak | Feb. 8, 1944 |
| 2,470,943 | Page | May 24, 1949 |
| 2,504,683 | Harnley | Apr. 18, 1950 |
| 2,644,586 | Cutter | July 7, 1953 |
| 2,702,034 | Walter | Feb. 15, 1955 |

FOREIGN PATENTS

| 7,090 | Great Britain | 1905 |